Figure 8:
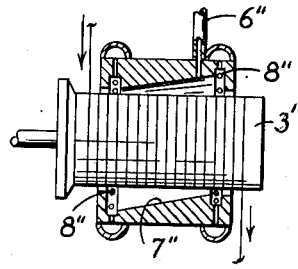

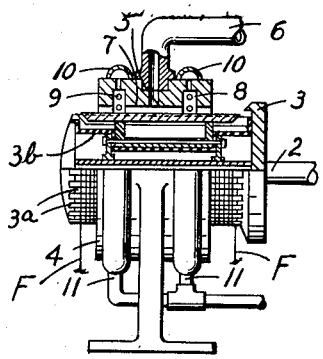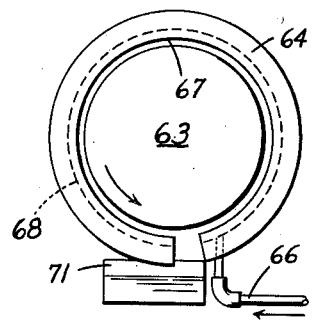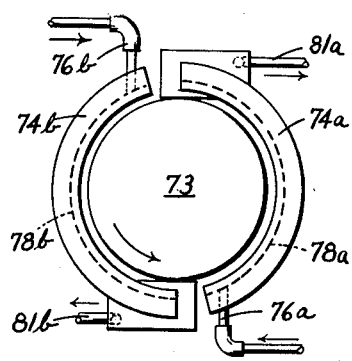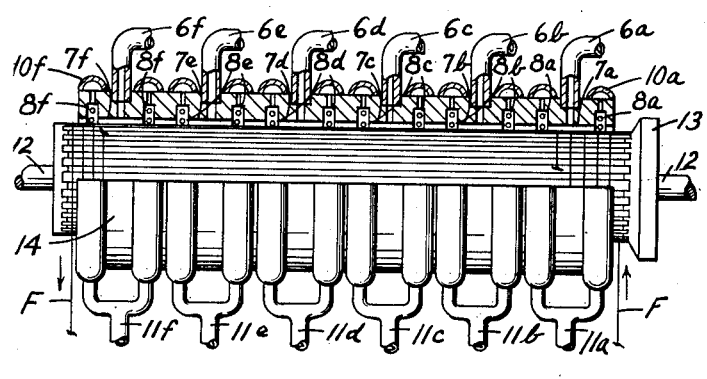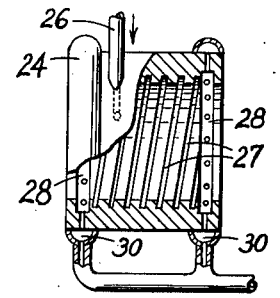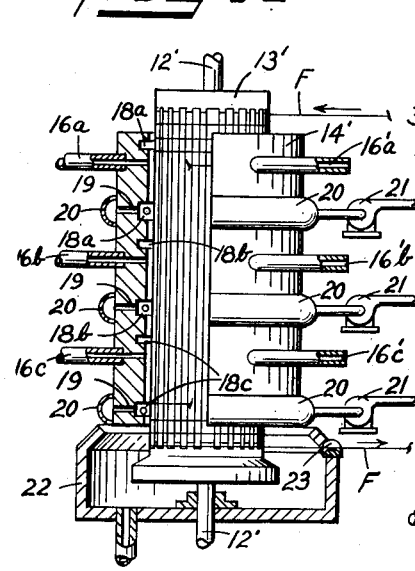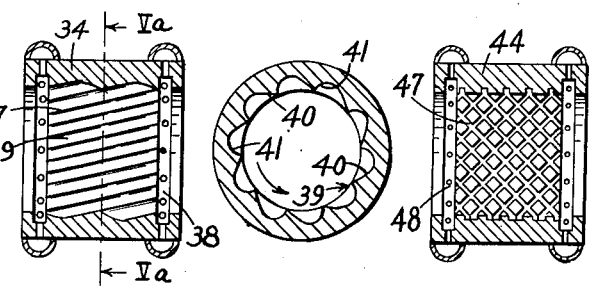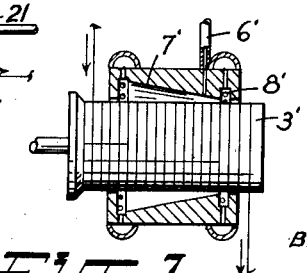

Jan. 15, 1952  R. W. STANLEY ET AL  2,582,293
REEL FOR FLUID TREATMENT OF FILAMENTARY MATERIALS
Filed Feb. 22, 1944  2 SHEETS—SHEET 2

INVENTORS.
Richard W. Stanley
William B. Lowe
BY Carl A. Castellan
ATTORNEY

Patented Jan. 15, 1952

2,582,293

UNITED STATES PATENT OFFICE 2,582,293

REEL FOR FLUID TREATMENT OF FILAMENTARY MATERIALS

Richard W. Stanley, Drexel Hill, and William B. Lowe, Chester, Pa., assignors to American Viscose Corporation, Wilmington, Del., a corporation of Delaware Application February 22, 1944, Serial No. 523,402

12 Claims. (Cl. 68—205)

This invention relates to apparatus for the liquid treatment of continuous filamentary material while continuously advancing such material through a generally helical path. The present application is a continuation-in-part of our co-pending application Serial No. 504,664, filed October 2, 1943.

It has heretofore been suggested to apply liquids to filamentary material while passing the filamentary material through a generally helical path over some form of thread-storing, thread-advancing device or reel. In general, reliance has been placed mainly upon gravitational forces to control the action of the liquids upon the filamentary material. Such control has its limitations, however, in that low relative velocities between the liquid and the filamentary material must prevail in order to avoid undue splashing with consequent loss of liquid and sloppy conditions in the plant.

In accordance with the present invention, liquid treatment of the filamentary material is effected by passing the material through a helical path over one or more thread-advancing devices or reels which may be driven at any desired speed, even at sufficient speed to fling the liquid off the periphery of the device or reel and the filamentary material by centrifugal force. A suitable guard or deflector is provided in close proximity about the periphery of the device or reel, and the liquid is continuously introduced into the channel or space between the reel and the guard in such amounts as to flood or gorge the space. By operating in this manner, the efficiency of the liquid treatment is greatly increased, since the liquid is forcibly caused to play upon the filamentary material at high relative velocity with respect thereto, regardless of the speed of rotation of the reel or other thread-advancing device. This action effects rapid removal and replacement of the liquid in contact with the filamentary material, and consequent improvement in the efficiency of a given liquid-processing operation. In addition, a thread-advancing device or reel of smaller diameter or length than heretofore possible may be used for a given linear peripheral speed of the filamentary material and when increased speeds of the filamentary material are desired, it is not necessary or desirable, as has been thought heretofore, to increase the diameter of the reel to prevent spraying of the liquid from the reel. For example, when operating reels under the conditions heretofore prevailing under which it was necessary to prevent the liquids from being thrown off the reels by centrifugal force, the maximum linear speed of the filamentary material is about 70 meters per minute on a reel having a diameter of about 5½ inches, about 90 meters per minute on a reel of about 8 inches diameter, and about 100 meters per minute on a reel of 10 inches diameter. It is to be noted that a condition of diminishing return occurs before the 10-inch reel is reached. This, however, is not the case when the technique of the present invention is used, since filamentary material may be handled at speeds of 125, 150, 200 or more meters per minute regardless of reel diameter and subject only to the limitation of bursting tensile strength of the material itself at the time of and under the conditions of liquid treatment. Thus, the invention gives rise to economy of liquid, equipment and space requirements.

In the drawing, illustrative of the invention—

Figure 1 is a side elevation with the upper half in cross section, showing a simple embodiment of the invention, Figure 1a is an end elevation of a modification, Figure 1b is a plan view of another modification, in which the reel axis is vertical, Figure 2 is a similar view, showing a modification of the invention adapted for the application of a series of liquids at successive portions of a single thread-advancing device or reel, Figure 3 is an elevation of a multi-stage system with the reel set up on a vertical axis, Figures 4, 5, 6, 7 and 8 show modifications of the surrounding deflector, Figure 5a is a cross section on line Va—Va of Figure 5.

Figure 9:
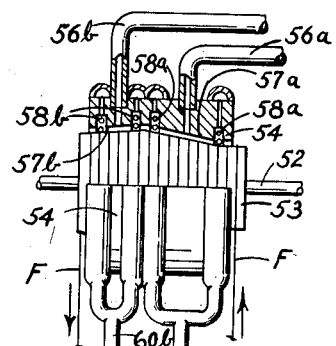
Figure 9A:
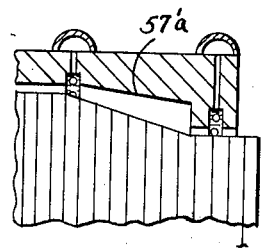
Figure 9B:
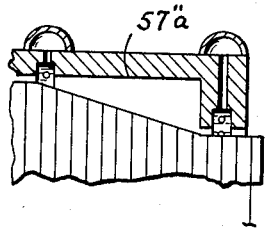
Figure 9C:
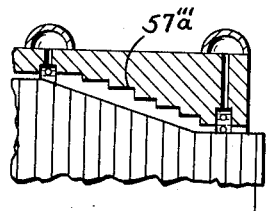
Figure 10:
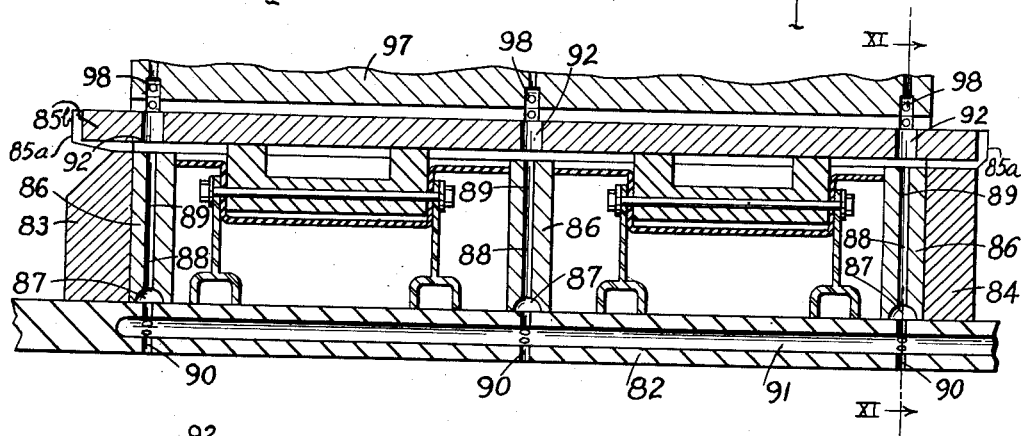
Figure 11:
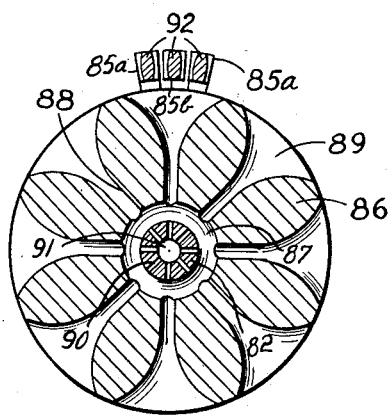

Figures 9, 9a, 9b, and 9c illustrate modified arrangements for effecting stretching of filamentary material while undergoing liquid treatment, Figure 10 is a longitudinal cross-section of a modification, and Figure 11 is a section taken on line XI—XI of Figure 10.

In Figure 1 there is shown, rotatably mounted on shaft 2, a thread-storage, thread-advancing device in the form of a reel 3 of conventional design and generally comprising two sets of inter-digitating spaced, longitudinally extending bar members 3a which form a cage-like drum about the periphery of which the filamentary material F follows a generally helical path. A flexible sealing member 3b of tubular or sleeve-like construction, such as an impermeable membrane or diaphragm of rubber, synthetic rubber, or of a rubber substitute, is secured in place within the bars 3a by the supporting structure therefor and protects the inner driving mechanism from the liquid. While Figure 1 shows a cantilever form of reel supported at one end only, any form of reel may be used, whether supported at one or both ends. A housing 4 surrounds the thread-advancing reel 3 along a portion of its length, which may be designated a zone, with sufficient clearance to permit free passage of the filamentary material F riding on reel 3.

A passage 5 connected to a feed pipe 6 permits the delivery of a liquid into the housing and to the filamentary material on the reel. Sufficient liquid is introduced to continually flood or gorge at least the space between the reel bars 3a and the deflecting surface 7 surrounding them, and preferably to flood the entire space between the flexible sealing member 3b and the surface 7. The terms "flood" and "gorge" are intended to refer to a condition in which the space or spaces referred to are maintained substantially full of the liquid throughout the processing. The passage 5 may be directed at any desired angle relative to the periphery of the reel, so that the liquid may be flowing in the same or opposite direction relative to the direction of travel of the bars of the reel where contact is first made. Preferably, the passage 5 directs the fluid tangentially in the same direction as the direction of rotation of the reel bars. A greater amount of turbulence at the point of entrance may be obtained by directing the fluid at an angle inclined more toward a normal or toward a tangent directed opposite to the direction of rotation of the reel. The inside surface 7 of the housing constitutes the external bounding surface of a generally annular liquid treating channel, whose innermost boundary is constituted of the flexible sealing member 3b, and serves as a guard to confine the liquid to the space within the limits defined by that surface, and it may be constituted of either a smooth, polished substantially cylindrical surface, as shown, or it may be roughened. Adjacent each end of the housing there is an annular liquid collecting groove 8, the base surface of which is connected by openings 9 to a surrounding jacket ring 10, which may be connected by a discharge pipe 11 to a vacuum pump, and thereby serves to withdraw the liquid from the zone of action upon the filamentary material. A pump (not shown) may be provided for recirculating the liquids removed from the system, and such liquids may be refreshed or fortified prior to such recirculation in conventional manner.

As shown, the passage 5 is approximately midway between the grooves 8. This may be varied considerably. Since the advancing action of the filamentary material over the reel 3 has a tendency to favor displacement of the liquid toward the discharge end of the reel, the passage 5 may advantageously be arranged to deliver the liquid to the filamentary material nearer to the receiving end of the reel than shown.

Instead of introducing the liquid in the fashion shown in Figure 1, it may be introduced to the interior of the reel cage into the space between the reel bars 3a and the seal 3b, such as by way of a suitable conduit leading from a bore within the axle or shaft by which or on which the reel is supported and rotated.

The clearance between the surface 7 and the filamentary material on the reel may be varied considerably with good results. From the standpoint of economy in the use and pumping of liquid, the smaller ranges of clearance are generally preferable.

The housing 4 preferably surrounds the desired treating zone of the reel completely. However, for certain purposes it may be desirable or even necessary to restrict the action of the fluid to only a portion of the periphery of a given zone of the reel. In this case, the deflecting means, such as the surface 7, may be provided only about a corresponding portion of the periphery of the reel, and the remaining portion of the periphery may be exposed or provided with a suitable housing or discharge receptacle or channel to catch the liquid thrown off in that region. As an example of this arrangement, reference may be had to Figure 1a in which the deflecting means 67, the collecting grooves 68, and the annular housing 64 may extend only 340° about the reel 63, the liquid being introduced through the pipe 66 between the surface 67 and the reel 63 at a point adjacent the end of the housing where the reel enters, and the discharge channel 71 may be arranged to receive the liquid from the grooves 68 and also from the 20° portion of the reel which is free of the deflecting means.

By providing, as shown in the plan view Figure 1b, a plurality of peripherally spaced axial slits between housings 74a and 74b, a discharge channel under each of the slits 81a and 81b respectively, and a liquid feed pipe (76a and 76b) at the reel entrance with respect to each of the peripherally spaced guard or deflector means 78a and 78b, it is possible to subject a helical band of the filamentary material simultaneously to a plurality of different treating liquids spaced peripherally of the helix.

Figure 2 is a view similar to Figure 1, showing an adaptation of the invention to a reel of considerably larger length, on which the filamentary material may be subjected to a plurality of different liquids in succession at axially spaced zones of the reel. For example, a yarn-like multiple-filament bundle proceeding from a spinneret and coagulating bath (not shown), may be received on one end of the reel 13 rotating on shaft 12, and may be advanced first through a washing zone or stage fed by pipe 6a with washing liquid, such as water, which zone is surrounded by a guard surface 7a and limited by collecting grooves 8a within the housing 14 discharging through pipes 11a.

The corresponding elements of succeeding stages are designated by reference numerals followed by succeeding letters of the alphabet. Illustratively, when regenerated cellulose from viscose is involved, a desulfurizing liquid, such as a solution of sodium sulfide, may be introduced into pipe 6b, a bleaching solution may be introduced into pipe 6c, a solution for neutralizing the residual bleach solution in the filamentary material may be introduced into pipe 6d, a soap or other finish may be introduced into pipe 6e, and heated air or steam may be introduced into pipe 6f for drying the material partially or completely. Suction is applied to the pipes 11 as in Figure 1. Additional stages may be used, if desired, such as additional washing stages intermediate those mentioned above.

It is obvious that reels having more or less liquid treatment stages may be used for processing filamentary materials during their spinning from other materials, such as cuprammonium cellulose solutions, protein solutions, resin solutions and the like. Of course, the processing system is also applicable to the treatment of natural or artificial filamentary material in the form of yarns, tows and the like, for purposes entirely unrelated to the after-treatment of freshly spun artificial filaments. Thus, the technique may be used for the application of textile conditioning agents, such as softeners, lubricants, sizes, and twist-setting agents, to prepare the filamentary material for subsequent textile fabricating operations, such as weaving, knitting and the like. Such treatments may be applied on a single stage reel, such as that of Figure 1, and this treatment may be followed by rinsing or other operations on a subsequent reel of either single-stage type or multiple-stage type, as in Figure 2.

While the processing reel is preferably disposed with its axis of rotation horizontal, it may be tilted at any angle to the horizontal, including a vertical disposition as shown in Figures 1b and 3. As shown in Figure 3, the reel 13' is arranged for a three-stage liquid treatment. Each stage may be provided with a plurality of liquid feed pipes 16a, 16a1; 16b, 16b'; and 16c and 16c', which direct the respective treating liquids near the upper portions of the several treating sections. The lower of each of the pairs of collecting grooves 18a, 18b and 18c has numerous spaced radial apertures 19, whose outer openings are surrounded by the jacket rings 20 connected to exhaust pumps 21 to remove the liquid from the respective treating zones and to prevent or hinder its overflow into the next zone therebelow. A drip pan 22 may be provided with a wall whose internal upper portion surrounds the lower edge of the housing 14' and the filamentary material may pass through a guide eye 23 of porcelain or other material in the wall of the drip pan. Instead of leading the filamentary material to the top and withdrawing it from the bottom, the reel 13' may be arranged to advance the material upwardly from the bottom to be discharged from the top, in which case liquid treatment on the countercurrent principle is accomplished.

Figure 4 shows a modification of the housing which may be used to obtain countercurrent liquid treatment action. The housing 24 shown is intended to be used with the reel 3 in the same relationship as shown in Figure 1, that is, with the thread advancing from right to left. The liquid is introduced by the pipe 26 at a point near the thread discharge end of the deflector surface 27, which is constituted of a helical groove having a right-handed screw-thread relation and extending substantially entirely across the space between the collecting grooves 28 connected with discharge pipes 30. The arrangement of the helical groove as shown serves to cause the main portion of the liquid to be displaced toward the groove 28 at the right of the device as seen in Figure 4, in spite of the normal tendency of the liquid to advance in the direction of the thread. The helical groove may take the form of a serrated thread instead of a square-cut thread.

Figures 5 and 5a show another form of deflecting surface 37 in a housing 34 having the collecting grooves 38. The surface 37 is constituted of a plurality of grooves 39. These grooves may be disposed at a low helix angle, as shown, to impart the desired directional influence to the liquid. The angle shown causes the liquid to travel from left to right when a reel, such as reel 3, is rotated within the housing in counterclockwise direction as viewed in Figure 5a. Liquid treatment on the countercurrent principle can thus be obtained by introducing the liquid into the system at the left and the filamentary material at the right. There are preferably no lands intervening between the grooves 39, and while the shape of the groove may be various, a preferred type is shown in Figure 5a in which a gently sloped side 40 gradually blends into a steeply sloped side 41, the reel within being rotated in a direction from the gently to the steeply sloped side, as shown by the arrow in Figure 5a.

Figure 6 shows a housing 44 having a deflecting surface 47 constituted of a diamond-patterned knurling. Collecting grooves 48 are provided at each end.

Figure 7 shows another method of obtaining directed flow axially of the processing reel 3'. Instead of grooving, rifling, or knurling the interior deflecting surface, this surface 7' may be substantially smooth but conical, or, more accurately, frusto-conical, with the larger internal diameter spaced axially from the smaller diameter in the direction in which it is desired that the fluid flow. The ends of the deflecting surface 7' may be joined with the collecting grooves 8'.

Figure 8 shows another arrangement for directing flow in which gravity is utilized. In this figure, the deflecting surface 7'' is cylindrical, but with its axis sloped or inclined with respect to the substantially horizontal axis of the processing reel 3'', the slope being directed downwardly toward the end of the reel toward which flow is desired.

Figure 9 illustrates a reel 53 on shaft 52. The filamentary material F is received on the reel at its small end and after advancing to a point within the housing 54 is gradually stretched as it progressively advances over a tapered portion of the reel, after which it may be relaxed somewhat by passage over a section of the reel having a diminishing taper. During the stretching portion of the processing, the filamentary material may be subjected to a plasticizing fluid such as steam or hot water introduced toward the small end of the tapered section by pipe 56a. Collecting grooves 58a serve to direct the effluent into discharge pipes 60a, to which, as in all the embodiments herein, suction may be applied. A rinsing liquid may be provided during the relaxing portion of the processing on the reel by the pipe 56b, collecting grooves 58b and discharge pipes 60b serving to remove the liquid from the second stage of treatment.

The stretching may not be followed immediately or at any subsequent stage by a relaxing stage. It may be combined with relaxing or any other precedent or subsequent processing treatment on the same reel of multiple stage character, or on other reels of either single or multiple stage character. Again, the drying section of a reel may be provided with a tapered section diminishing in diameter to allow shrinkage to occur during drying. While the surfaces 57a and 57b are frusto-conical and correspond closely to the taper of the reel adjacent them, they may be tilted at an angle with respect to the tapered reel surfaces (as shown at 57a' in Figure 9a) or they may in fact be substantially cylindrical (as at 57a'' in Figure 9b), or they may be constituted of a plurality of stepped cylindrical surfaces (as at 57a''' in Figure 9c). Tapered or cylindrical deflecting surfaces which are stepped like 57a''' may be used with a cylindrical reel in place of the smooth tapered or inclined cylindrical deflecting surface shown in Figures 7 and 8 for the purpose of imparting an axial component to the direction of flow of the floid.

Figures 10 and 11 show an embodiment of the invention in which the reel is of the type shown in Figures 7 and 8 of our co-pending application Serial No. 508,174, filed October 29, 1943, now Patent Number 2,403,031 of July 2, 1946, and comprises a shaft 82, which may or may not be rotatable, and flanges 83 and 84 for carrying one of the two sets of bars 85a, which may conventionally be concentric with respect to the shaft. The other set of bars 85b may be mounted in conventional fashion to effect thread-advancing action, such as eccentrically of the first set. Secured to the inner face of each flange is a member 86 provided with an annular groove 87, which communicates with a group of radiating passages 88 which fan out peripherally at 89, as clearly shown in Figure 11. The grooves 87 are in communication with a source of compressed air (not shown) through radial passages 90 extending from the axial bore 91 in the shaft 82, the air supply being connected to the bore 91 by conventional means. The bar members 85a and 85b which form the reel have narrowed portions 92 in the same plane as the fan-shaped openings 89 of the passages 88 in members 86, and the collecting grooves 98 on both sides of the guard or deflector surface 97 are arranged to surround the narrowed portions 92 of the bar members. By this construction, the discharge of the liquid from the liquid-treating section of the reel is facilitated by virtue of the outward directing force of the air through passages 88, 89 and through the narrowed portions 92 of the bar members 85 of the reel. This arrangement may be used with or without the application of suction to the collecting grooves 98, but it is preferable to use such suction as well. In a multi-stage reel, each liquid-treating stage may be flanked by the radial sheet of air to assure removal of the liquid from the reel, and to prevent its flowing into the next section. Each sheet of air can be obtained from the single bore in the shaft, regardless of whether the shaft rotates or not.

In all the embodiments of the present invention, thread guides may be placed adjacent the points of approach and departure of the filamentary material with respect to the thread-advancing devices or reels to control any tendency of the material to whip from side to side or to balloon. The method and apparatus of the present invention may be applied with advantage to the continuous spinning of artificial filaments in place of the methods and devices heretofore used for this purpose.

It is to be understood that changes and variations may be made without departing from the spirit and scope of the invention as defined by the appended claims.

We claim:

1. Apparatus for treating filamentary material with liquids comprising a rotatable thread-advancing reel for feeding continuous filamentary material through a helical path, means for rotating the reel bodily about its axis, a guard member outside the reel and spaced from the helix having a generally arcuate internal surface closely surrounding a zone comprising a plurality of turns of the helix in a generally concentric relationship, and means for flooding the space including the zone of the helix within the guard member with the liquid.

2. Apparatus for treating filamentary material with liquids comprising a rotatable thread-advancing reel for feeding continuous filamentary material through a helical path, means for rotating the reel bodily about its axis, means for applying a liquid to the material at a portion of the helix, means for driving the device at sufficient speed to throw the liquid off the filamentary material by centrifugal force, and guard means spaced from the helix having a generally arcuate internal surface generally concentrically arranged about at least a portion of the helix for causing the liquid to flow generally as a sheet in a narrow space immediately about and at least partially including a zone of the helix of material so that the fluid continually plays upon the material in the zone.

3. Apparatus for treating filamentary material with liquids comprising a rotatable thread-advancing reel for feeding continuous filamentary material through a helical path, means for rotating the reel bodily about its axis, said reel having impermeable partitioning means adjacent and within the path, a guard member outside the reel and spaced from the helix having a generally arcuate internal surface extending as a whole concentrically outside of at least a substantial portion of the periphery of the helix, the partitioning means and the surface of the guard member defining a channel about at least a portion of the helix, and means for flooding the channel with a liquid.

4. Apparatus for treating filamentary material with liquids comprising a reel having interdigitating bar members for advancing the material in a generally helical path axially of the reel and having impermeable partitioning means adjacent to and within the bar members, a stationary guard member outside the reel and spaced from the helix having a generally arcuate internal surface extending as a whole concentrically outside of a substantial portion of the periphery of the reel, means for rotating the reel in the guard, the partitioning means and the surface of the guard defining a channel about a portion of the helix, means for introducing a liquid into the channel adjacent the point of entrance of the reel bars therein to flood the channel, and means adjacent the point of exit of the reel bars from the channel for receiving the discharge from the channel.

5. Apparatus for treating filamentary material with liquids comprising a reel having interdigitating bar members for advancing the material in a generally helical path axially of the reel and having impermeable partitioning means adjacent to and within the bar members, a plurality of stationary guard members each spaced from the reel and being spaced from each other peripherally about a zone of the reel, each guard having a generally arcuate internal surface extending as a whole concentrically outside of and in close proximity to a substantial portion of the periphery of the reel, means for rotating the reel, the partitioning means and the surface of the guards defining a plurality of peripherally spaced channels about a zone of the helix, a plurality of means for introducing liquids into the channels adjacent the points of entrance of the reel bars therein to flood the respective channels with the liquids, and means adjacent the point of exit of the reel bars from the channel for receiving the discharge from the channel.

6. Apparatus for treating filamentary material with liquids comprising a rotatable thread-advancing reel for feeding continuous filamentary material through a helical path, means for rotating the reel bodily about its axis, said reel having impermeable partitioning means adjacent and within the path, a guard member outside the reel and spaced from the helix having a generally arcuate internal surface closely surrounding a zone comprising a plurality of turns of the helix in a generally concentric relationship, the partitioning means and the surface of the guard member defining a channel about the helix, and means for flooding the channel with a liquid.

7. Apparatus for treating filamentary material with liquids comprising a rotatable thread-advancing reel for feeding continuous filamentary material through a helical path, means for rotating the reel bodily about its axis, said reel having impermeable partitioning means adjacent and within the path, a plurality of axially spaced guard members each spaced from the helix and having a generally arcuate internal surface closely surrounding a zone comprising a plurality of turns of the helix in a generally concentric relationship, the partitioning means and the surfaces of the guard members defining a plurality of axially spaced channels about the helix, and means for flooding the channels with a plurality of liquids.

8. Apparatus for treating filamentary material with liquids comprising a rotatable thread-advancing reel for feeding continuous filamentary material through a helical path, means for rotating the reel bodily about its axis, said reel having impermeable partitioning means adjacent and within the path, a guard member outside the reel and spaced from the helix having a generally arcuate internal surface surrounding a zone comprising a plurality of turns of the helix in a generally concentric relationship, the partitioning means and the surface of the guard member defining a channel about the helix, and means for flooding the channel with a liquid, said guard member being constructed and arranged to impart a component of motion to a substantial portion of the liquid to cause it to move generally toward one end of the zone.

9. Apparatus for treating filamentary material with liquids comprising a rotatable thread-advancing reel for feeding continuous filamentary material through a helical path, means for rotating the reel bodily about its axis, a guard member outside the reel and spaced from the helix having a helically grooved, generally annular surface extending as a whole concentrically outside of and in close proximity to at least a substantial portion of the helix, and means for flooding the space including the portion of the helix within the guard member with a liquid.

10. Apparatus for treating filamentary material with liquids comprising a rotatable thread-advancing reel for feeding continuous filamentary material through a helical path, means for rotating the reel bodily about its axis, a guard member outside the reel and spaced from the helix having a frusto-conical surface extending about and in close proximity to at least a substantial portion of the helix, and means for flooding the space including the portion of the helix within the guard member with a liquid.

11. Apparatus for treating filamentary material with liquids comprising a rotatable thread-advancing reel for feeding continuous filamentary material through a helical path, means for rotating the reel bodily about its axis, a guard member outside the reel and spaced from the helix having a generally arcuate internal surface closely surrounding a zone comprising a plurality of turns of the helix in a generally concentric relationship, means for flooding the space including the zone of the helix within the guard member with the liquid, said surface of the guard member being helically grooved to impart a component of motion to a substantial portion of the liquid to cause it to move generally toward one end of the zone.

12. Apparatus for treating filamentary material with liquids comprising a rotatable thread-advancing reel for feeding continuous filamentary material through a helical path, means for rotating the reel bodily about its axis, a guard member outside the reel and spaced from the helix having a surface closely surrounding a zone of the helix, means for flooding the space including the zone of the helix within the guard member with the liquid, said surface of the guard member being frusto-conical to impart a component of motion to a substantial portion of the liquid to cause it to move generally toward one end of the zone.

RICHARD W. STANLEY.
WILLIAM B. LOWE.

REFERENCES CITED

The following references are of record in the file of this patent:

UNITED STATES PATENTS

| Number | Name | Date |
| --- | --- | --- |
| Re. 17,096 | Johnston | Oct. 2, 1928 |
| 1,082,428 | Koch et al. | Dec. 23, 1913 |
| 1,129,692 | Koch et al. | Feb. 23, 1915 |
| 1,402,765 | Haskell | Jan. 10, 1922 |
| 1,682,453 | Willheim | Aug. 28, 1928 |
| 1,734,737 | Martindell | Nov. 5, 1929 |
| 2,023,477 | Knebusch et al. | Dec. 10, 1935 |
| 2,108,285 | Forrest | Feb. 15, 1938 |
| 2,194,470 | Hartmann | Mar. 26, 1940 |
| 2,203,793 | Lovett | June 11, 1940 |
| 2,226,286 | Knebusch | Dec. 24, 1940 |
| 2,294,902 | Gram | Sept. 8, 1942 |
| 2,300,690 | Neuman | Nov. 3, 1942 |
| 2,303,052 | Kline | Nov. 24, 1942 |

FOREIGN PATENTS

| Number | Country | Date |
| --- | --- | --- |
| 20,604 | Great Britain | of 1897 |